(12) United States Patent
Beltran et al.

(10) Patent No.: US 8,132,115 B2
(45) Date of Patent: Mar. 6, 2012

(54) DYNAMIC PROPERTIES FOR SOFTWARE OBJECTS

(75) Inventors: John G. Beltran, San Rafael, CA (US); Phillip D. Beymer, Berkeley, CA (US); David Stroud, Santa Rosa, CA (US)

(73) Assignee: Autodesk, Inc., San Rafael, CA (US)

( * ) Notice: Subject to any disclaimer, the term of this patent is extended or adjusted under 35 U.S.C. 154(b) by 2525 days.

(21) Appl. No.: 10/781,307

(22) Filed: Feb. 18, 2004

(65) Prior Publication Data

US 2004/0172615 A1    Sep. 2, 2004

Related U.S. Application Data

(60) Provisional application No. 60/450,472, filed on Feb. 27, 2003.

(51) Int. Cl.
*G06F 3/048* (2006.01)
(52) U.S. Cl. ......................... 715/763; 715/764
(58) Field of Classification Search .................. 715/762; 717/113; 707/102, 103
See application file for complete search history.

(56) References Cited

U.S. PATENT DOCUMENTS

| | | | | |
|---|---|---|---|---|
| 6,486,893 | B1 * | 11/2002 | Ramchandani et al. | 715/762 |
| 6,915,301 | B2 * | 7/2005 | Hirsch | 707/102 |
| 7,047,241 | B1 * | 5/2006 | Erickson | 707/9 |
| 2002/0158905 | A1 * | 10/2002 | Bazzoni et al. | 345/760 |
| 2004/0227776 | A1 * | 11/2004 | Bent et al. | 345/700 |
| 2005/0091576 | A1 * | 4/2005 | Relyea et al. | 715/502 |

OTHER PUBLICATIONS

AutoCAD Release 13, AutoCAD Runtime Extension [ARX] Overview, Interface Product Marketing Autodesk Engineering Group. pp. 1-4, Jun. 1, 1995.
Creation of Dispatch API Functions, http://msdn.microsoft.com/library/en-us/automat/htm/chap5__82r7.asp?frame=true, Microsoft Corporation, p. 1., Platform SDK Release: Oct. 2002.
Dispatch Interface and API Functions, http://msdn.microsoft.com/library/en-us/automat/htm/chap5__5r9v.asp?frame=true, Microsoft Corporation, p. 1, Platform SDK Release: Oct. 2002.
IDispatch Interface, http://msdn/microsoft.com/library/en-us/automat/htm/chap5__78v9.asp?frame=true, Microsoft Corporation, p. 1, Platform SDK Release: Oct. 2002.
IDispatch::GetType Info, http://msdn.microsoft.com/library/en-us/automat/chap5__8ani.asp?frame=true, Microsoft Corporation, p. 1-2, Platform SDK Release: Oct. 2002.
IDispatch::GetType InfoCount, http://msdn.microsoft.com/library/en-us/automat/chap5__3alw.asp?frame=true,\, Microsoft Corporation, p. 1-2, Platform SDK Release: Oct. 2002.
IDispatch::GetIDsOfNames, http://msdn.microsoft.com/library/en-us/automat/chap5__32cz.asp?frame=true,\, Microsoft Corporation, p. 1-3, Platform SDK Release: Oct. 2002.
IDispatch::Invoke, http://msdn.microsoft.com/library/en-us/automat/htm/chap5__61lid.asp?frame=true,\, Microsoft Corporation, p. 1-3, Platform SDK Release: Oct. 2002.
TN038: MFC/OLE IUnknown Implementation, http://msdn.microsoft.com/library/en-us/vcmfc98html/_mfenotes_tn038.asp?frame=true, pp. 1-14, Microsoft Corporation, 2004.

* cited by examiner

*Primary Examiner* — Omar Abdul-Ali
(74) *Attorney, Agent, or Firm* — Gates & Cooper LLP (57) ABSTRACT

A method, apparatus and article of manufacture provide for displaying per-instance dynamic properties of an object. A reference to an object instance having a dynamic property that is supplied at runtime for the object instance on a per-instance basis and is not stored with the object is received. A reference to a property source instance, that maintains knowledge of the dynamic property, associated with the object, is retrieved. The references are provided to a control that retrieves and displays the dynamic property. Additionally, the object may provide/specify a custom ActiveX control that defines a user interface for displaying and editing one or more properties. The custom control is instantiated and used to display the property in the defined user interface.

14 Claims, 9 Drawing Sheets

DYNAMIC PROPERTIES FOR SOFTWARE OBJECTS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Patent Application Ser. No. 60/450,472, filed Feb. 27, 2003, by John G. Beltran, Montgomery Graf, Phillip D. Beymer, and David Stroud, entitled "PROPERTY PALETTE,".

BACKGROUND OF THE INVENTION

1. Field of the Invention

The present invention relates generally to software objects, and in particular, to a method, apparatus, and article of manufacture for dynamically extending the properties of a software object and the ability to manipulate such properties through a user interface control.

2. Description of the Related Art

Software objects are frequently used by applications to represent collections of properties that can be modified by the user. For example, in a drawing application, a software object may be a circle having a radius, color, etc. Normally, the collection of properties of the object is fixed. In other words, when an application defines the class for the object, the collection of properties is fixed at compile time.

The prior art may support the use of properties created at runtime (referred to as dynamic properties). Such dynamic properties are not stored with the object itself and when the application that defines the properties is unloaded, or terminated, the runtime properties may be discarded. Further, dynamic properties are on a class-wide or object wide basis and do not vary between objects of the same type. For example, the same dynamic properties would apply to each instance of an object and different instances cannot have different dynamic properties. However, it may be desirable to vary dynamic object properties on a per-instance basis such that different object instances of the same type have a different collection of properties.

An example of a dynamic property would be if an object in a drawing program is a circle. An application may desire to dynamically extend the properties of the circle object such that the circle object represents a manhole cover having a manufacturer and weight property. The prior art would permit all circle objects to be dynamically extended such that each circle object instance represents a manhole cover with these properties. Also suppose that another application desires to dynamically extend the circle object such that the circle object represents a round table having a height and a number of table extensions. The prior art would not permit both the first application and second application to extend different instances of the same circle object such that one instance represents a manhole cover and the other instance represents a round table (i.e., with the different instances having different properties). Thus, it would be desirable to allow dynamic properties on a per-instance basis.

In addition to the above, applications typically present the properties of one or more objects to the user in a graphical user interface. Such a graphical user interface may consist of a window or dialog box. Each dialog box is usually implemented to display the properties of just a few kinds of objects, with dialog controls (buttons, text fields, etc.) specific to the kind of data those objects contain. In this regard, a user interface may base the dialog control that is used on the type of object. For example, a boolean property may be displayed using a radio button dialog control, and a numerical value may be displayed using a text entry box dialog control.

In certain circumstances, the default selection of a dialog control may not be the most desirable or appropriate control to use to display the property. For example, a property may be a temperature value with a double precision number. The prior art would likely provide a default text field for adjusting the temperature value. However, it may be more desirable to use a slider to adjust the value of the temperature where the slider has minimum and maximum values. Accordingly, it would be desirable to allow an object to specify the dialog control that is used to display a particular property of the object.

SUMMARY OF THE INVENTION

Software objects are frequently used by applications to represent collections of properties which can be modified by a user. Normally the collection of properties of the object is fixed and does not vary between objects of the same type. Further, applications typically present the properties of one or more objects to the user in a dialog box that displays just a few kinds of objects with dialog controls specific to the kind of data those objects contain.

One or more embodiments of the invention provide a mechanism whereby the collection of properties for an object is dynamically extended on a per-instance basis. The mechanism consists of a dynamically extensible set of one or more "property source" objects, user interface components, and the object. When composing the user interface to display the properties, the user interface components call methods on the property source objects and pass the source objects a reference to the object about to be edited. The source objects dynamically generate zero or more additional properties and return them to the user interface components, which then display the complete collection of properties to the user for editing.

Additionally, objects may provide their own user interface controls for individual properties of an object. These user interface controls are then collectively displayed on a single dialog box by the application.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
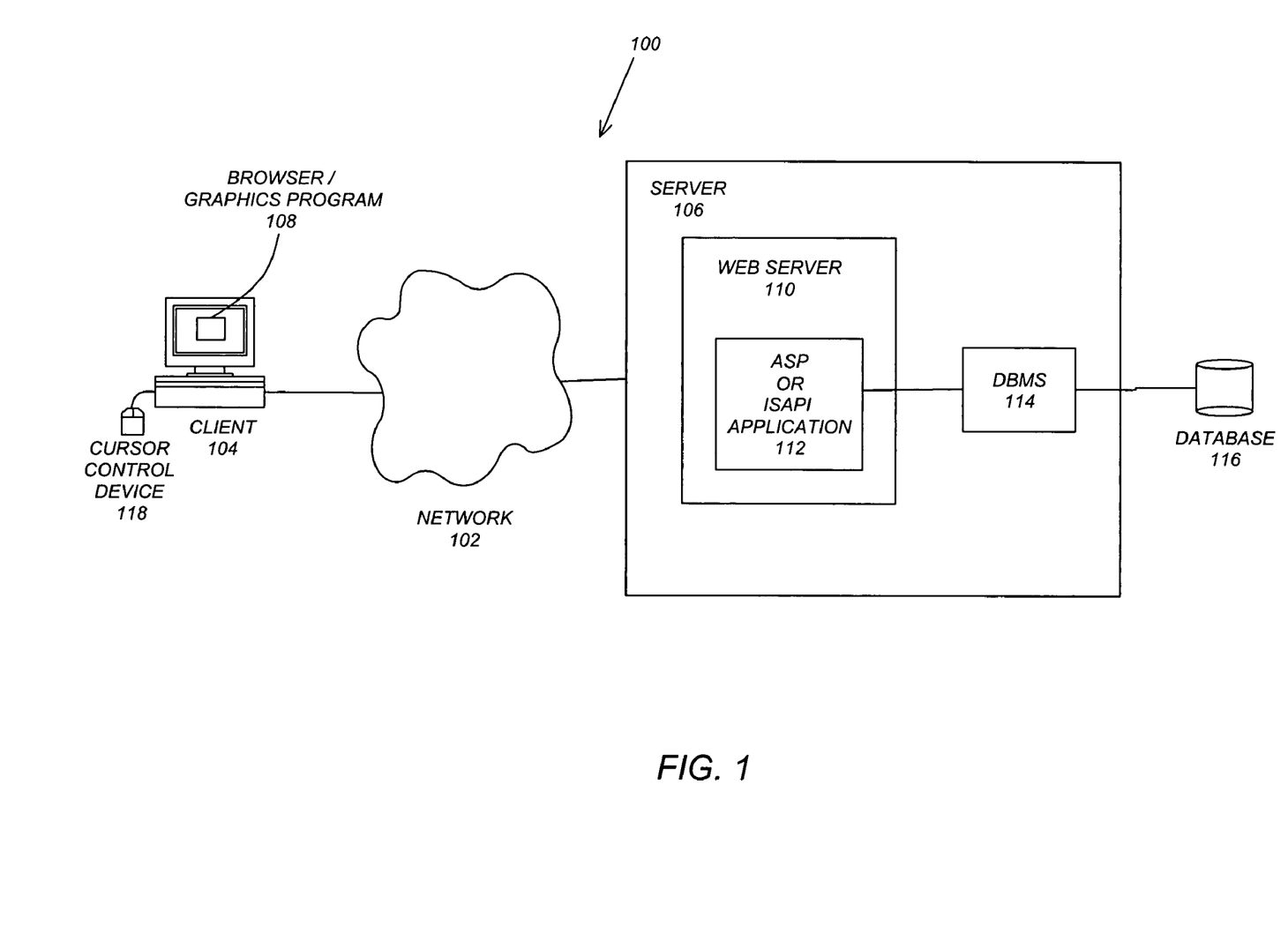
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, local area networks (LANs), wide area networks (WANs), system network architecture (SNA) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Additionally, network 102 may utilize radio frequency (RF) to connect and provide the communication between clients 104 and servers 106. Clients 104 may execute a client application/graphics program/Web browser 108 and communicate with server computers 106 executing Web servers 110. When client application is a Web browser 108, it is typically a program such as NETSCAPE NAVIGATOR™ or MICROSOFT INTERNET EXPLORER™. Further, the software executing on clients 104 may be downloaded from server computer 106 to client computers 104 and installed as a plug in or ActiveX control of a Web browser or graphics program 108. Accordingly, clients 104 may utilize ActiveX components/component object model (COM) or distributed COM (DCOM) components to provide a user interface on a display of client 104. The Web server 110 is typically a program such as Microsoft's Internet Information Server.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize Microsoft's Transaction Server (MTS) to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Computer-Implemented Graphics Program

Figure 2:
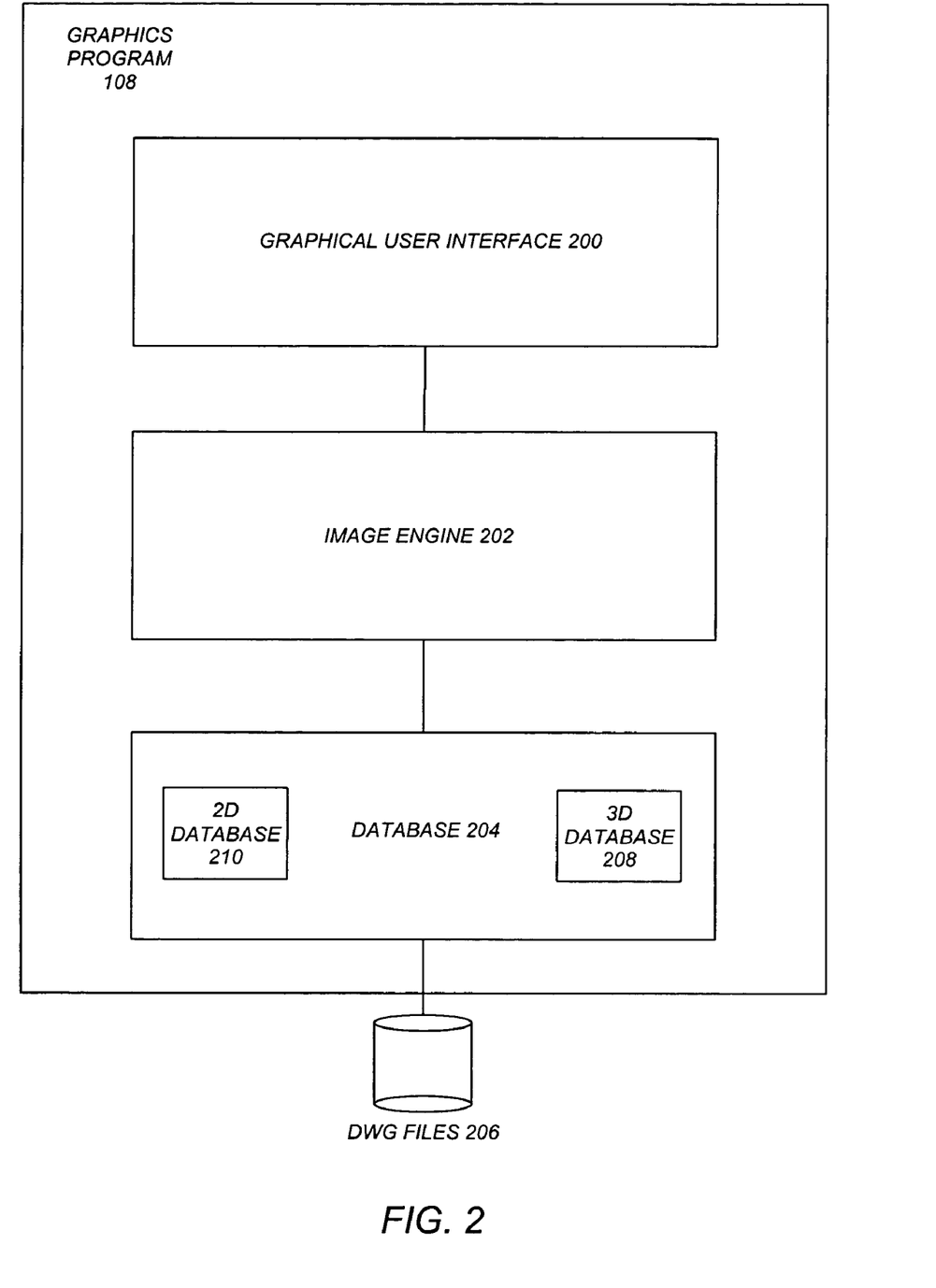
FIG. 2 is a block diagram that illustrates the components of a graphics program in accordance with one or more embodiments of the invention.

FIG. 2 is a block diagram that illustrates the components of the graphics program 108 in accordance with one or more embodiments of the invention. There are three main components to the graphics program 108, including: a Graphical User Interface (GUI) 200, an Image Engine (IME) 202, and a DataBase (DB) 204 for storing drawing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In one or more embodiments, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Object List

In object oriented programming, classes define properties and methods/functions that manipulate those properties. A particular instance of a class is referred to as an object (or object-oriented object). When an instance of a class is created (i.e., at run-time), initial values for the various properties may be assigned. In graphics programs 108, objects may be of various types having multiple properties. Such objects may represent shapes or other items of interest.

Figure 3:
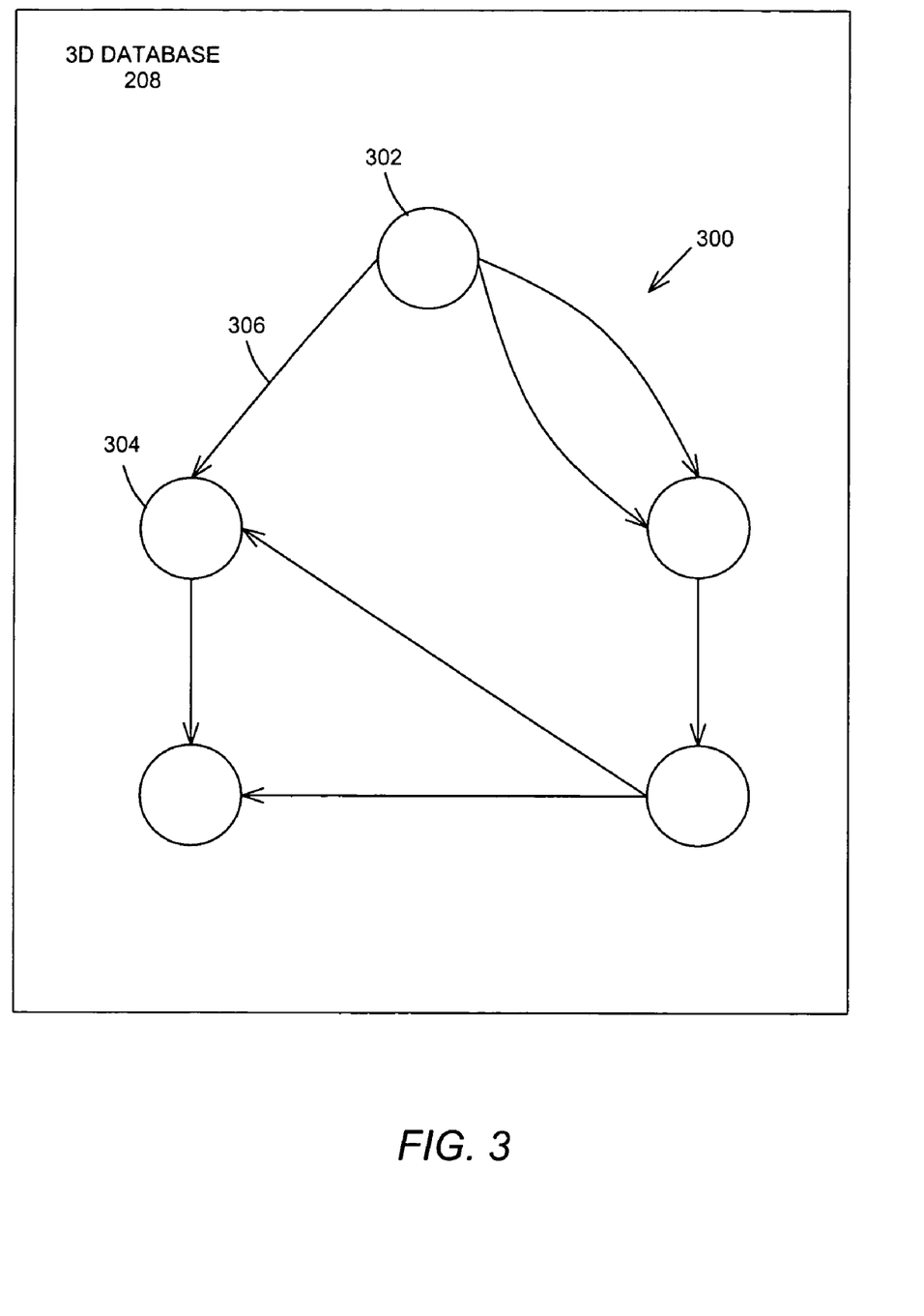
FIG. 3 is a block diagram that illustrates the structure of an object list maintained by 3D databases in accordance with one or more embodiments of the invention.

FIG. 3 is a block diagram that illustrates the structure of an object list 300 maintained by the 3D databases 208 in accordance with one or more embodiments of the invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 208.

Per-Instance Dynamic Extension of Property Sets

One or more embodiments of the invention provide a mechanism whereby the collection of properties for an object is dynamically extended on a per-instance basis. The mechanism consists of a dynamically extensible set of one or more "property source" or "property factory" objects, user interface components (e.g., a dialog control), and an object. When composing the user interface to display the properties of an object, the interface components call methods on a property source/factory and pass a reference to the object about to be edited. The property source/factory dynamically generates zero or more additional properties and returns these properties to the interface components. The interface components may then display the complete collection of properties to the user for editing.

Figure 4:
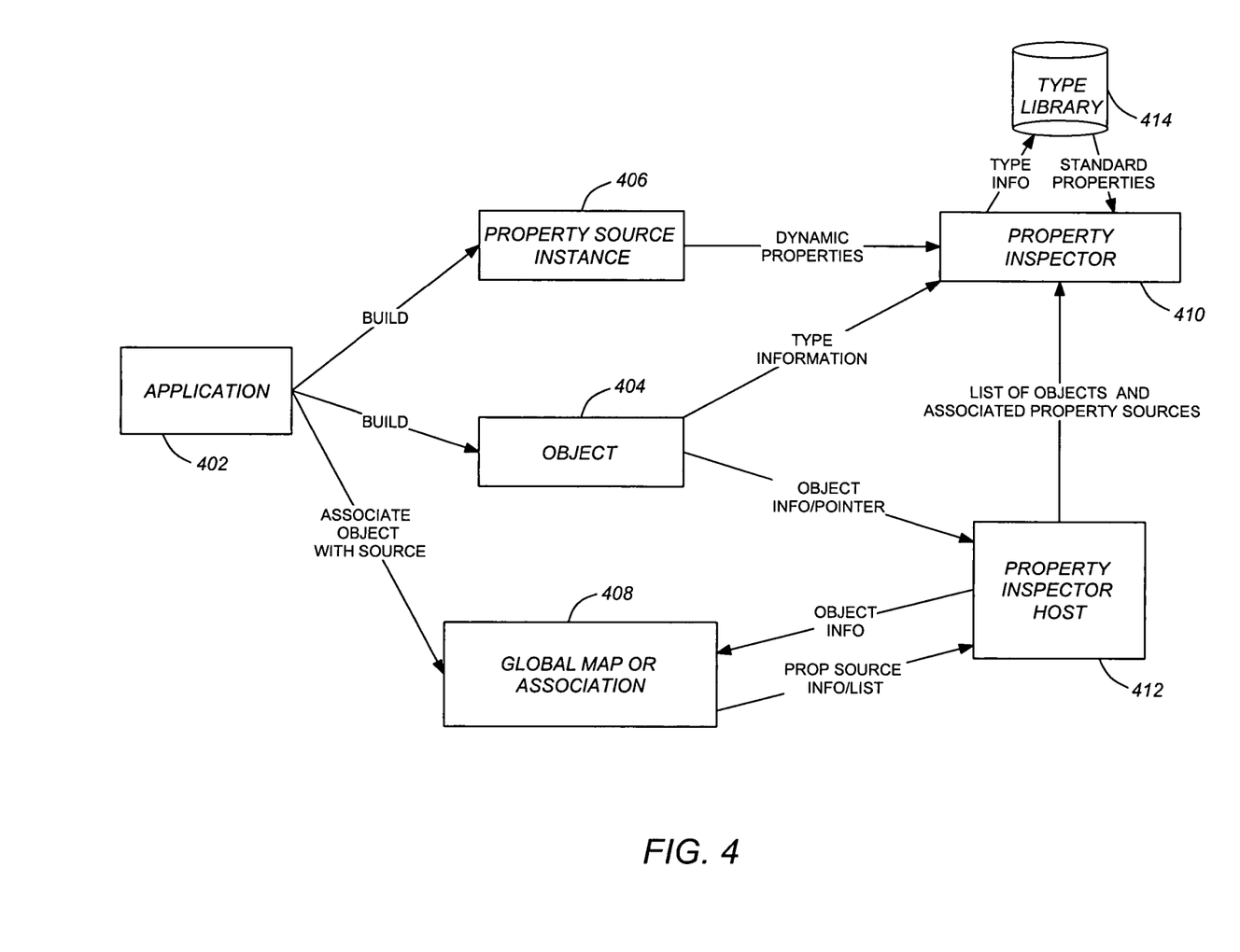
FIG. 4 illustrates the architecture for supporting dynamic per-instance properties in accordance with one or more embodiments of the invention.

FIG. 4 illustrates the architecture for supporting dynamic per-instance properties in accordance with one or more embodiments of the invention. FIG. 4 illustrates the use of an application 402 such as a drawing program (as described above) or a third party application that may provide objects and functionality for a drawing program. An object class 404 may be defined or used by an application. During runtime, the object instance (e.g., a COM object instance) of the class is created/instantiated.

To create per-instance dynamic properties (i.e., for one or more instances of the objects 404), the application 402 utilizes a property source 406. In this regard, the application 402 may implement a property source interface to provide the per-instance dynamic properties for each object instance. Applications 402 may typically implement the property source interface on one or more COM objects 404. Once the property source instances 406 and object classes 404 have been created, the various object classes 404 and source instances 406 may be stored in an application framework.

Once the property source 406 and objects 404 have been created, an association between the property sources 406 and the object class 404 must be formed. In general, the association is entirely up to the host 412 of the inspector 410. The host 412 may determine, for example, that sources 406 are associated with objects 404 on an instance-by-instance basis through some application-defined mapping. Alternatively, the host 412 may determine that sources 406 are associated with objects 404 on an instance-by-class basis (i.e., property source instances 406 are associated with an object class 404 definition). Both the kind of relationship, and the actual relationships, are arbitrary but deterministic and are defined by the application 402 providing the sources 406.

For example, the relationship may be between an object class 404 and property source instances 406. Alternatively, application 402 may create a mapping or association 408 between an object instance and one or more property source instances 406. An example of one such type of association is a global listing or mapping 408 that is available to various applications.

To display the various object properties, whether static, dynamic, and/or per-instance dynamic properties, an ActiveX control may be used. As described above, an ActiveX control is a software module that is based on the COM architecture. An ActiveX control may enable a program to add functionality by calling ready-made components that blend in and appear as normal parts of the program. In one or more embodiments, an ActiveX control referred to as a property inspector 410 is responsible for querying instances of objects 404 or other property sources 406 for property type information. Since the properties are displayed at run-time, and it is desirable to have per-instance dynamic properties, the property inspector 410 may need a mapping or listing of object instances to property source instance 406.

Once instances of objects 404 and property sources 406 have been queried, the property inspector 410 builds, displays, and manages a grid containing the properties it discovers. Thus, the property inspector 410 maintains a properties collection that consists of an internal representation of properties to be displayed. The property collection includes property type and value information, property category information, etc.

The property inspector operates on a COM level rather than at the drawing program level. Accordingly, the property inspector 410 is able to manage properties of any COM object 404 that implements its interfaces. In this regard, the ability to manage COM object 404 properties may extend to COM objects 404 that do not represent drawing program objects.

As with all ActiveX controls, a program or container 412 must host the property inspector 410. An example of a host program 412 in a drawing program environment is a properties palette application dialog. The properties palette dialog provides a single user interface for editing all types of drawing objects 404. However, to display an object's 404 unique properties (e.g., dynamic and per-instance dynamic properties), the properties palette or other host application 412 must implement the appropriate COM interfaces (i.e., the property inspector 410).

The property inspector host 412 may push a collection of objects 404 onto the property inspector 410 for display. Thus, the property inspector host 412 first obtains the relevant object 404 information. For example, the object 404 information or a pointer to the various object classes 404 may be obtained. Thereafter, the property inspector host 412 uses the object 404 information to identify the relevant property source instances 406 associated with each object class 404. In this regard, the property inspector host 412 may query the global map or association to determine which property source instances 406 are associated with each object class 404. The list of object classes 404 and property source instances 406 may then be passed to the property inspector 410 for processing.

As described above, given a list of relevant object classes 404, the property inspector 410 is responsible for determining and creating a properties collection of the properties to be displayed for one or more instances of the object. The static properties (i.e., those properties that were created at compile time for the various objects 404) may first be determined. To obtain the static properties, the property inspector 410 uses the list (that may contain object class 404 pointers) provided (by the host 412) to query individual objects 404 (i.e., runtime instances of the objects 404) for property type information. To determine the standard or static properties, the property inspector 410 may access a type library 414 (i.e., using the type information obtained from the object instances). As illustrated, the property inspector 410 may pass the type information to the type library to determine the standard properties. The standard/static properties are then added to the properties collection maintained by the property inspector 410.

The property inspector 410 then retrieves the dynamic per-instance properties from the property source instances 406. In one or more embodiments, to retrieve such dynamic per-instance properties, the inspector 410 may pass a reference of an object class 404 (associated with the property source 406) to the property source 406. The property source 406 can look up the reference and return one or more dynamic properties if a record with the reference is found. The per-instance dynamic properties can then be added to the properties collection. The property inspector 410 displays the properties collection using the appropriate or designated user interfaces (see further description below regarding user interfaces).

As described above, in general, the association between an object 404 and property source instances 406 are entirely up to the host. Further, the kind of relationship 408 and actual relationship may be defined by the application 402 providing the source 406. A more specific example of the association 408 is the association 408 utilized in a drawing program such as AutoCAD™. In such an implementation, the association 408 is a particular kind of map 408 that associates object classes 404 with property source instances 406. However, as indicated above, since the properties are per-instance dynamic properties, the inspector 410 may need an association between object instances 404 and source instances 406 to create per-instance dynamic properties for the run-time objects 404. Accordingly, a host 412 (such a property palette dialog) may build the instance relationship 408 by determining the class of each object 404 selected and looking up the associated property source 406 in a class->source map 408. In this way, a single source 406 may be associated with several objects 404 in the selection.

For example, suppose a manhole application is written on top of a drawing program that extends certain kinds of circle objects 404 to have a weight property. The manhole application 402 maintains, through its own data structures and user interface, a map of object IDs to manhole weights (every object 404 such as circle objects have unique IDs). The manhole application 402 implements a property source 406 for manholes. The implementation of this source 406 looks up IDs of objects 404 passed to it in the ID->weight map, and returns a dynamic property for each matching record. The application 402 instantiates an instance of the property source 406 and associates it with the drawing program's circle class 404 (i.e., in the global map 408).

When a user picks a circle in the drawing program, the property palette dialog (host 412) looks up the object 404 in the class->source map 408 and finds the application's source 406. This source 406 is passed to the property inspector 410 for every circle object 404 selected. The inspector 410 discovers the static circle properties through the type interface 414 (e.g., radius, color, etc.). To discover the per-instance properties, the inspector 410 passes a reference to the circle object 404 to the property source 406, which looks up the circle's ID and returns a dynamic property for the circle's weight if a record with that ID was found.

Figure 5A:
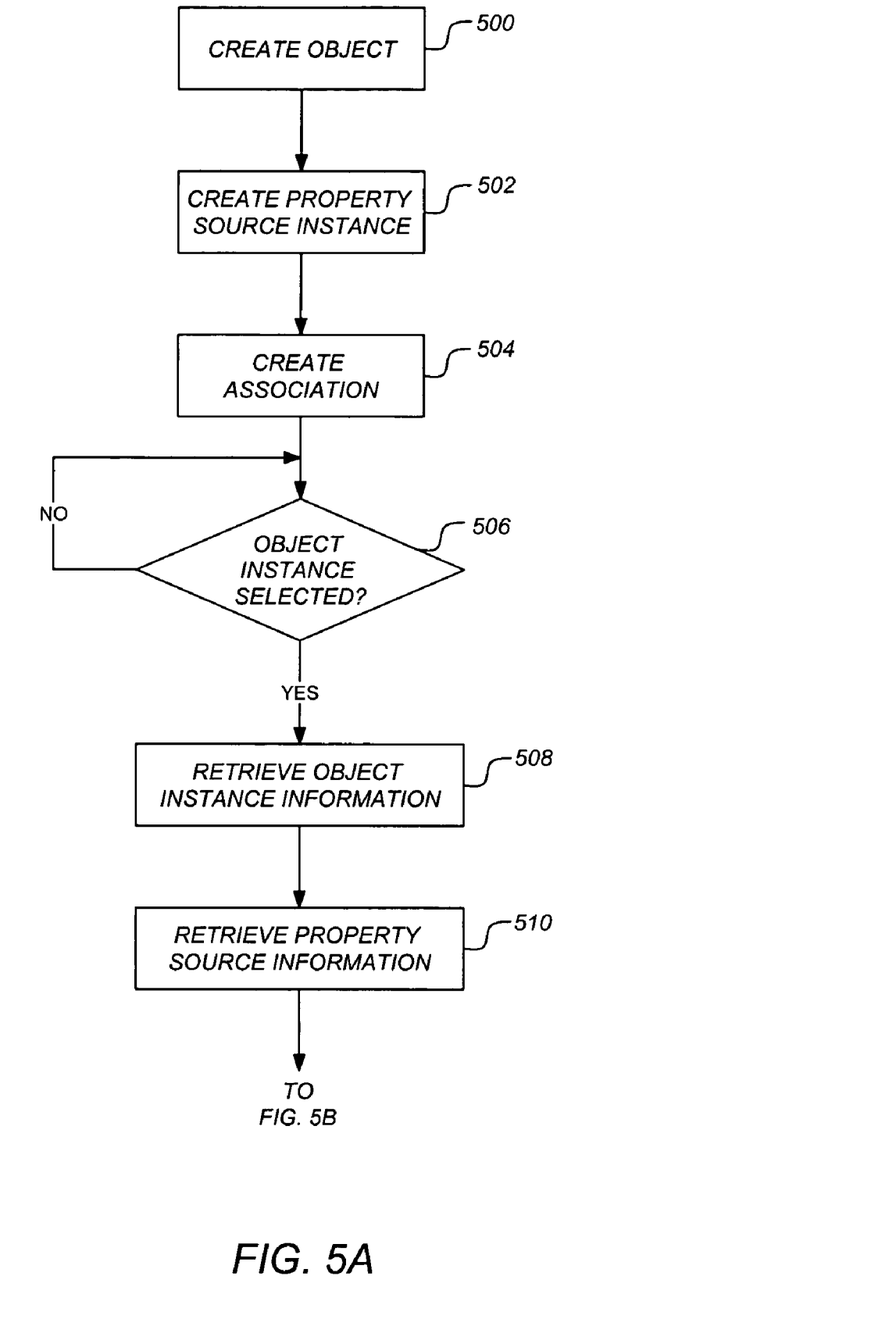
FIGS. 5A and 5B are flow charts illustrating the use and display of per-instance dynamic properties in accordance with one or more embodiments of the invention.
Figure 5B:
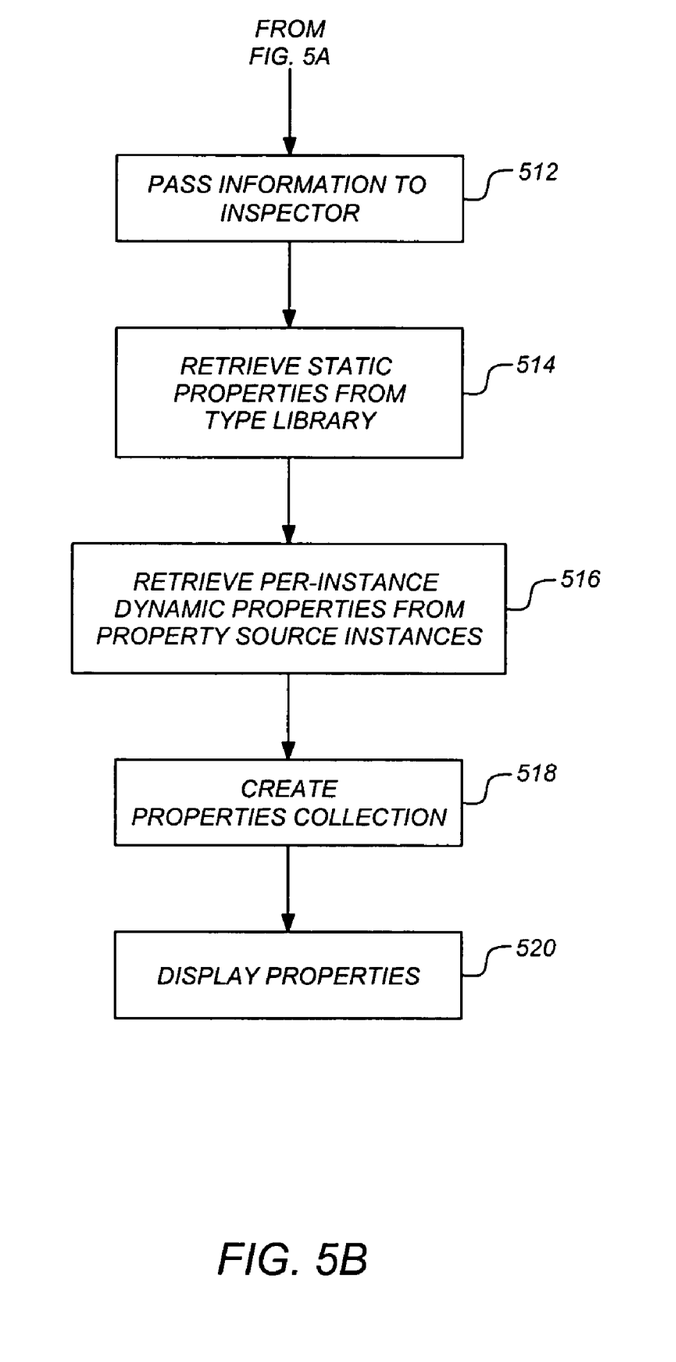

FIGS. 5A and 5B are flow charts illustrating the use and display of per-instance dynamic properties in accordance with one or more embodiments of the invention. At step 500, an application creates an object class 404. The object class is instantiated at run-time, to form an object instance. At step 502, a property source instance 406 for per-instance dynamic properties of object instances is created (e.g., by an application desiring to extend the object property set of the object 404). The property source instances 406 and per-instance dynamic properties are not stored with the object 404 and are supplied/created at runtime. At step 504, an association between an object class 404 and property source instances 406 are created/formed. Alternatively, the association may be between object instances and property source instances 406.

At step 506, a determination is made regarding whether an instance of the object 404 has been selected (e.g., for editing by a user). For example, a user may select a graphical object displayed in a drawing program with a desire to move or edit properties of the object instance. Once an object instance has been selected, the process may proceed to step 508.

At step 508, an ActiveX control host 412 (e.g., the property inspector host) retrieves object instance information (such as a pointer to the object instance) from the object instance 404. The host 412 then uses the object instance information to access the association/global map 408 and retrieve property source instance information at step 510. For example, the class of the object instance may be determined and examined in the global map/association 408.

At step 512, the host 412 passes the collected information to the ActiveX control 410 (e.g., the property inspector). The ActiveX control 410 is responsible for creating a list or collection of properties to be displayed. Accordingly, the control 410 may gather the type information from the objects 404 (by examining the object's 404 class definition) and use the type information to obtain the standard/static properties from a type library/interface 414 at step 514.

At step 516, the control 410 retrieves the per-instance dynamic properties from the property source instances 406. To retrieve such information, the appropriate property sources 406 (as identified by the host 412 and passed to the inspector 410) may be forwarded a reference to an object 404 to the property source instance 406. The property source instance 406 (that may also be referred to as a property factory) may examine the reference and dynamically generates zero or more additional per-instance dynamic properties and returns the properties to the control 410 (e.g., if a record with the reference is found). The control 410 then builds the collection of properties at step 518. Thereafter, the collection of properties may be displayed at step 520.

Custom Graphical User Interfaces

In the prior art, a dialog box, created by the property inspector 410, is used to display a properties and property values of an object 404. However, the dialog box is limited to displaying the properties of just a few kinds of objects 404, with dialog controls specific to the kind of data those objects 404 contain. Further, the user interface used within the dialog box (to display the property and value) is often predetermined and static. In this regard, the user may not be permitted to specify or create a user interface that should be used to display the property and value. One or more embodiments of the invention provide the capability to specify and use a custom user interface.

The property inspector control 410 is responsible for displaying the various properties in a graphical user interface. One or more embodiments of the invention allow objects 404 to provide their own user interface controls (to the control 410) for individual properties of the object 404 to be displayed. These interface controls may then be collectively displayed on a single dialog box by the control 410. More specifically, the invention provides an application "push" model, rather than a dialog "pull" model, allowing an application or application object the ability to refresh single properties in real time by communicating with a single control.

The invention also provides one dialog box to display (or "browse") the properties of many object types, regardless of the number of kinds of properties exposed by those objects. An object may provide a user interface control for manipulating each property it exposes.

As described above with respect to FIG. 4, property inspector host 412 may be a property palette application/control. The properties palette is a feature that lets users view and modify the properties of all types of entities/objects in a single dialog box. For instance, a user can select a line and a circle and see the properties of either one—endpoints, center point, radius, thickness, linetype, color, etc. displayed in the same modeless user interface. Changeable properties can be edited through this interface, with the changes reflected immediately in the displayed graphics.

Figure 6:
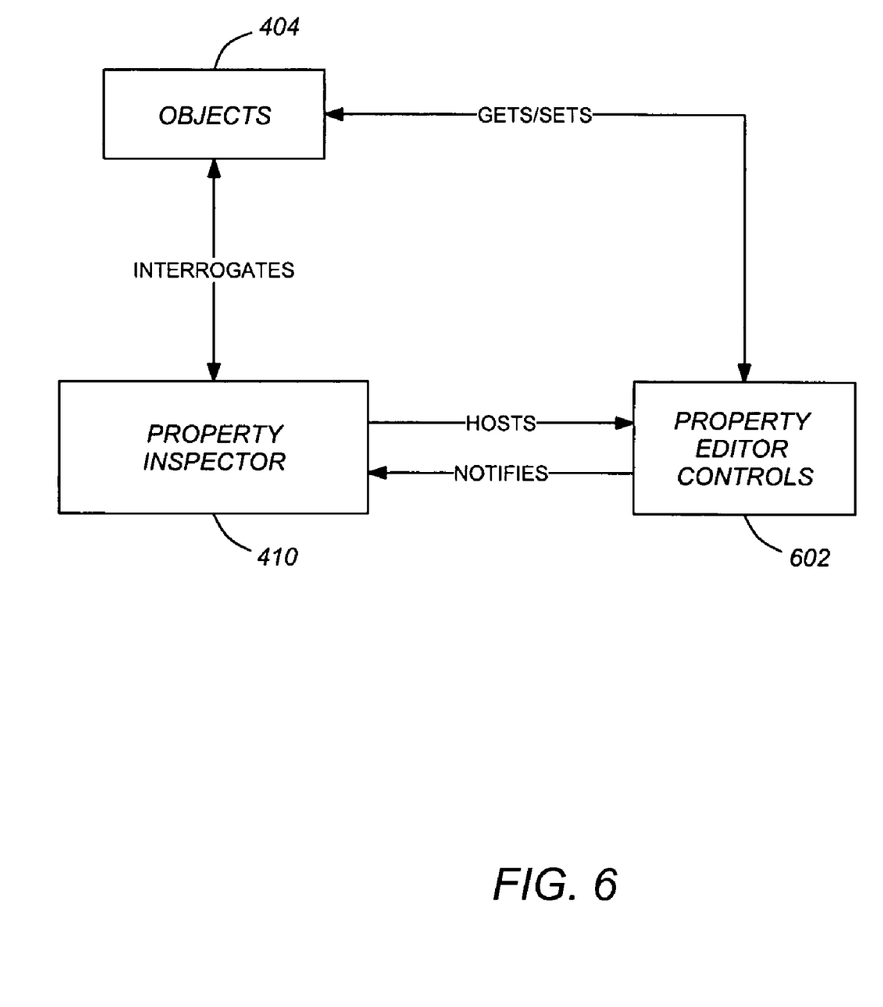
FIG. 6 illustrates the architecture for providing custom graphical user interfaces for implementing properties in accordance with one or more embodiments of the invention.

FIG. 6 illustrates the architecture for providing custom graphical user interfaces for implementing properties in accordance with one or more embodiments of the invention. As described above with respect to FIG. 4, the property inspector 410 interrogates the instance of the object 404 when it is selected (i.e., for the type information). In addition, the property inspector 410 may be provided (by the object 404) a reference to a custom control 602 used to display a particular property of the object 404.

From the interrogation, the inspector 410 discovers the object's properties (e.g., using the type library as illustrated in FIG. 4) and constructs a grid of property editing controls 602 (i.e., a grid of the user interfaces/editor controls 602 to be used to display and modify an object's properties). Each property may have a property editor control 602 instance that is used to display and modify the property. Thus, the object 404 "identifies" edit control classes that the inspector 410 should instantiate for representing properties. The "identified" edit controls may be custom controls that an application has provided specifically for that purpose.

The property inspector 410 hosts the property editor controls 602 used to display, acquire, and modify the object's properties. The property editing controls 602 are responsible for displaying the property data/values and allowing the user to modify the property data. If the user triggers an input event within a property editor control 602, the control 602 notifies the property inspector 410 so that the user interface/appearance can be updated. Further, the property editor control 602 may communicate directly with the objects 404 to get and set the property's value.

As used herein, the property editor controls 602 may expose themselves as instantiable ActiveX controls. These controls 602 expose methods or properties for customizing their appearance. In addition, the property editor controls 602 may modify the property or object directly using COM calls to set new values on the object or property. To create the ActiveX property editor controls 602, the property inspector 410 or another control hosted by the property inspector (referred to as a property palette list control) may instantiate the property editor controls 602 (i.e., once informed which editor control 602 to use by the object 404). Thus, the inspector 410 may act as a host for ActiveX controls 602 to edit and display object properties. If a property provides a custom ActiveX control, the inspector 410 instantiates and hosts it. If a property does not provide a custom control, then the inspector 410 may instantiate a stock control when the property is edited.

Thus, as illustrated in FIG. 6, the property inspector 410 is responsible for discovering properties, displaying property lists and hosting property editor controls 602. The property editor controls 602 are responsible for getting and setting property values for objects 404, providing custom property displays and communicating with the host/property inspector 410.

The custom graphical user interface capability may be enabled through the use of an application programming interface. Such an API may allow the property inspector 410 the ability to customize the appearance of the property in the user interface dialog box on a per-property basis. For example, the use of an interface may provide the ability to adjust the label font and color, label icons, and other label properties. Further, such an API may allow each property to specify its own proper editor control 602 by returning an instance of an ActiveX control to the inspector 410. Such an interface may also expose methods to indicate that a property should be represented as a command button in the dialog box.

Figure 7:
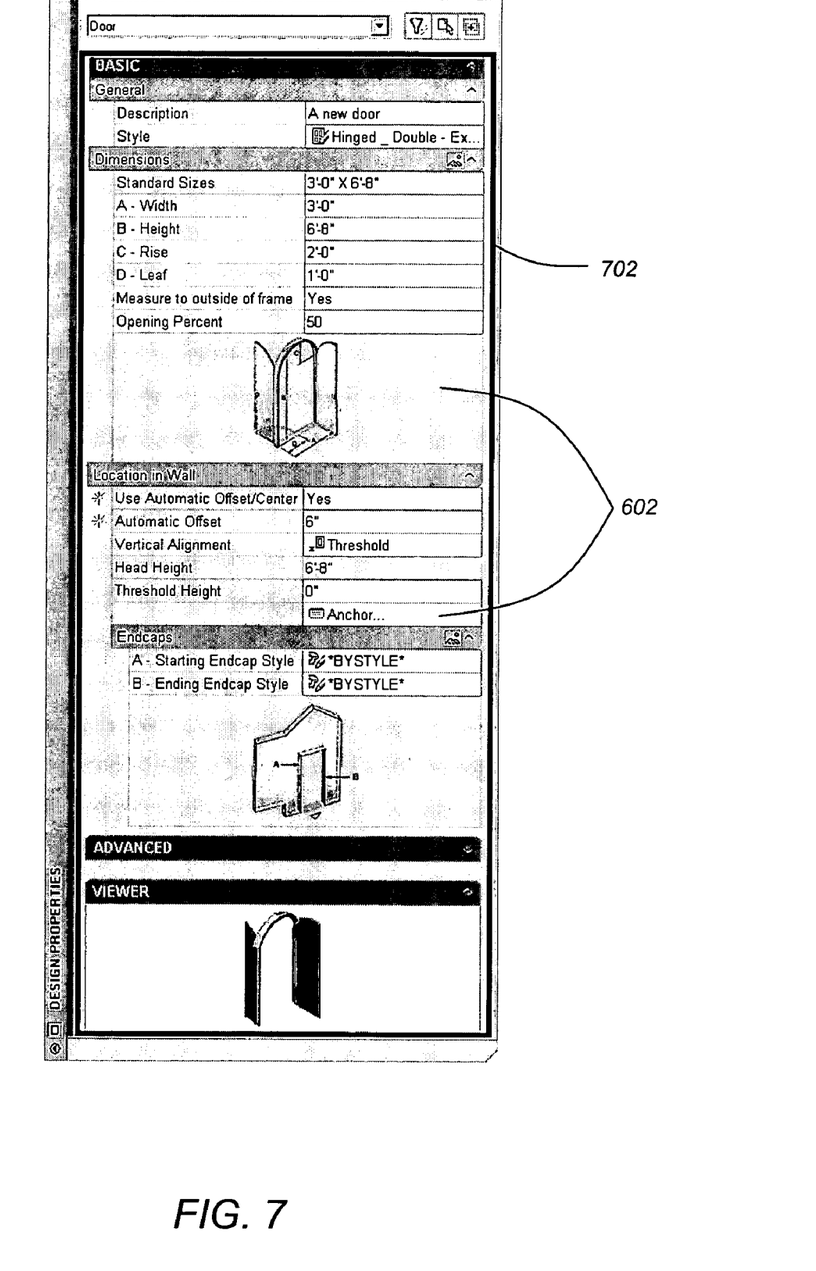
FIG. 7 illustrates a property palette user interface displayed in accordance with one or more embodiments of the invention.

FIG. 7 illustrates a property palette user interface displayed in accordance with one or more embodiments of the invention. Property editor controls 602 shown in FIG. 7 illustrate the custom controls provided by a property for displaying the property and value. When a custom control 602 is provided, the control exists as long as the palette displays the property. If no custom control 602 is returned by a given property, then the property list control 702 (that hosts the custom editor controls 602) may instantiate a stock property editor control based on the property type when the user clicks on a property. Property editor controls instantiated this way may exist only while actually editing the property.

The list control 702 hosted by the property inspector 410 is responsible for displaying the properties of one or more objets. If no custom property editor control 602 has been provided for the property, the list control 702 instantiates stock property editor controls as needed when the user clicks on a property to change the property value.

In view of the above, an example of a custom control 602 may better aid in understanding the invention. Assuming a circle object is the object selected for editing. In such an example, the circle object may have three properties, a color, center point and radius. If the circle object did not specify custom editor controls 602 for editing the properties, stock editor controls may be used to display the graphical user interface. For example, the color field may be displayed using a text field to enter in the color. Similarly, a text string may be used to enter the x,y coordinates for the center point, and a text string may also be used to enter the radius value. However, the circle object may also specify custom editor controls 602. Such a custom editor control 602 may provide for using a combo-box where the user can select a color to be used. Further, a button may be displayed that allows the user to actually click or select the center point in the graphical display of the object. Additionally, a slide bar may be used to select/alter the radius information. Accordingly, custom user interfaces may provide significant flexibility to an application and an object.

Figure 8:
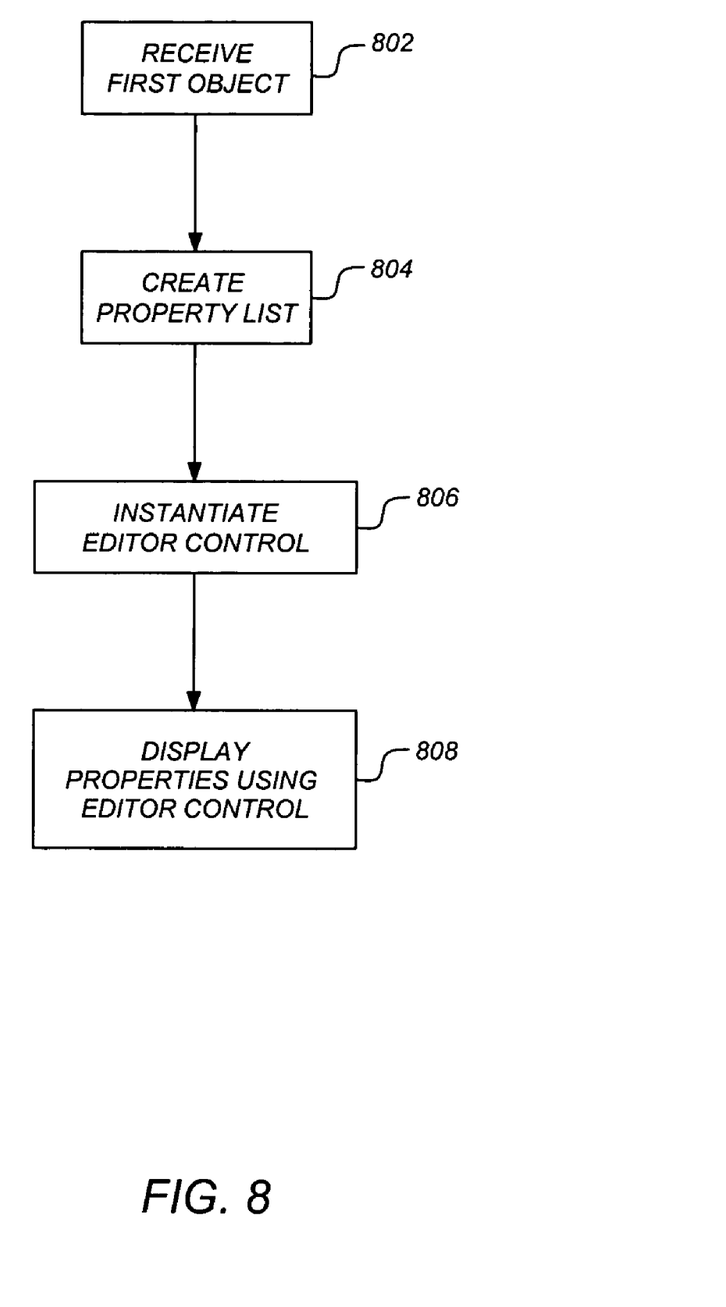
FIG. 8 is a flow chart illustrating the use of a custom graphical user interface in accordance with one or more embodiments of the invention.

FIG. 8 is a flow chart illustrating the use of a custom graphical user interface in accordance with one or more embodiments of the invention. At step 802, a first object 404 is received that has one or more properties. The object 404 specifies/provides a custom ActiveX control (i.e., an editor control 602) that defines a user interface for displaying and editing one of the properties. In this regard, an API may be used to push the custom ActiveX control 602 with the object to another object or control (e.g., the property inspector 410) for display.

At step 804, a list of the one or more object properties to be displayed is created (e.g., by the property inspector 410 creating a properties collection). The list of properties includes the property having a custom ActiveX control 602. At step 806, the ActiveX control/editor control 602 is instantiated (e.g., by the property inspector 410). As described above, one or more stock ActiveX control that define additional user interfaces for displaying and editing properties in the object list (that don't have an associated custom editor control 602 that was specified by the object 404), may be instantiated.

At step 808, the controls 602 are used to display the object properties in the list. In this regard, the custom user interface (created by the specified ActiveX control/editor control 602) is used to display its associated property. Such a user interface may be part of a single dialog box that is used to display multiple properties of different types. Further, the custom user interface may be used to edit the property (which is then set in the object 404).

CONCLUSION

This concludes the description of the one or more embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method for displaying per-instance dynamic properties of an object and the ability to specify a custom user interface for displaying a property on a per-property basis.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for displaying per-instance dynamic properties of an object comprising:
   (a) receiving a reference to an object instance having a dynamic property that is created at runtime for the object instance on a per-instance basis and is not stored with the object;
   (b) retrieving a reference to a property source instance from an association between the object and the property source instance, wherein the property source instance creates and supplies the dynamic property and an initial value for the dynamic property for/to the object instance; and
   (c) providing the reference to the object instance and the reference to the property source instance to a control, wherein the control is configured to:
      (i) retrieve the dynamic property from the property source instance; and
      (ii) display the dynamic property in a user interface.

2. The method of claim 1, wherein the dynamic property is provided by an application that is extending an object property set of the object.

3. The method of claim 1, wherein the reference to the property source instance is retrieved from a mapping of property source instances to object class.

4. The method of claim 1, wherein the control is further configured to:
   retrieve the standard properties for the object; and
   display the standard properties.

5. A computer-implemented system for displaying per-instance dynamic properties of an object comprising:
   (a) a computer;
   (b) an application executing on the computer;
   (c) an object instance, in the application, having a dynamic property that is created at runtime for the object instance on a per-instance bases and is not stored with the object;
   (d) a property source instance, in the application, wherein the property source instance creates and supplies the dynamic property and an initial value for the dynamic property for/to the object instance;
   (e) an association, in the application, between the object and the property source instance; and
   (f) a host, in the application, configured to:
      (i) retrieve a reference to the object instance;
      (ii) retrieve a reference to the property source instance from the association; and
      (iii) provide the reference to the object instance and the reference to the property source instance to a control, wherein the control is configured to:
         (1) retrieve the dynamic property from the property source instance; and
         (2) display the dynamic property in a user interface.

6. The system of claim 5, wherein the dynamic property is provided by an application that is extending an object property set of the object.

7. The system of claim 5, further comprising a mapping of property source instances to object classes, wherein the host is configured to retrieve the reference to the property source instance from the mapping.

8. The system of claim 5, wherein the control is further configured to:
   retrieve the standard properties for the object; and
   display the standard properties.

9. A computer-implemented method for providing a custom graphical user interface for editing a property of an object, comprising:
   receiving a first object having a first property, wherein the first object provides a custom ActiveX control that defines a first user interface for displaying and editing the first property;
   creating a list of one or more object properties to be displayed, wherein the list includes the first property;
   instantiating the custom ActiveX control; and
   displaying the object properties in the list, wherein the display of the first property comprises the first user interface defined by the instantiated custom ActiveX control, wherein the property may be edited through the first user interface.

10. The method of claim 9, further comprising instantiating one or more stock ActiveX controls that define one or more additional user interfaces for displaying and editing remaining object properties in the list, wherein the stock ActiveX controls are not provided by any object containing one or more of the remaining object properties.

11. The method of claim 10, wherein the first user interface and additional user interfaces are displayed in a single dialog box.

12. The method of claim 9, wherein an application programming interface provides the ability to push the first object to a second object for display.

13. A computer-implemented system for displaying per-instance dynamic properties of an object comprising:
   (a) an object instance of a class, wherein:
      (i) an initial value for one or more static properties of the class are assigned at run time; and
      (ii) the object instance has a dynamic property and an initial value of the dynamic property that are both generated and supplied, by a property source instance, at runtime for the object instance, on a per-instance basis and are not stored with the object;
   (b) an association between either:
      (i) the object instance and the property source instance; or
      (ii) the class and the property source instance; and
   (c) a user interface component that displays a collection of properties of the object instance including the one or more static properties and the dynamic property on a display device, wherein the user interface component is configured to:

(i) retrieve a reference to the object instance;
(ii) retrieve the one or more static properties from the object instance;
(iii) access the association to determine the property source instance associated with the object instance;
(iv) call a method of the determined property source instance with the reference to the associated object instance;
(v) receive the dynamic property, from the property source instance, wherein the property source instance dynamically generated the dynamic property and an initial value for the dynamic property; and
(vi) display the static property and the dynamic property on the display device.

14. The method of claim 9, wherein:
custom ActiveX controls are provided on a per-property basis;
two or more object properties are in the properties list; and
the two or more object properties are displayed in a list, wherein each of the two or more object properties are displayed using user interfaces defined by the custom ActiveX controls.

\* \* \* \* \*